(12) United States Patent
Oh et al.

(10) Patent No.: US 7,701,663 B2
(45) Date of Patent: Apr. 20, 2010

(54) HARD DISC DRIVE INCLUDING GROUND RIB TO CONNECT COVER AND BASE

(75) Inventors: Young-Rok Oh, Seoul (KR); Ho-Joong Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 529 days.

(21) Appl. No.: 11/607,969

(22) Filed: Dec. 4, 2006

(65) Prior Publication Data

US 2007/0139814 A1      Jun. 21, 2007

(30) Foreign Application Priority Data

Dec. 19, 2005   (KR) ...................... 10-2005-0125038

(51) Int. Cl.
  *G11B 33/02*  (2006.01)
  *G11B 33/14*  (2006.01)
(52) U.S. Cl. ................................. 360/97.01; 360/97.02
(58) Field of Classification Search .............. 360/97.01, 360/97.02, 98.01, 97.03
  See application file for complete search history.

(56) References Cited

U.S. PATENT DOCUMENTS

| | | | | |
|---|---|---|---|---|
| 5,179,482 A | * | 1/1993 | Tanaka et al. ............ | 360/97.01 |
| 5,187,621 A | * | 2/1993 | Tacklind ................... | 360/97.02 |
| 5,272,580 A | * | 12/1993 | Hickox et al. ............ | 360/97.02 |
| 5,646,801 A | * | 7/1997 | Boigenzahn et al. ..... | 360/97.01 |
| 5,760,997 A | * | 6/1998 | Koyanagi et al. ........ | 360/97.01 |
| 6,661,603 B1 | * | 12/2003 | Watkins et al. ........... | 360/97.01 |
| 7,209,317 B1 | * | 4/2007 | Berding et al. ........... | 360/97.01 |
| 7,385,784 B1 | * | 6/2008 | Berding et al. ........... | 360/97.02 |

FOREIGN PATENT DOCUMENTS

| | | |
|---|---|---|
| JP | 24232685 | 8/1992 |
| JP | 5012837 | 1/1993 |
| KR | 1020050034376 | 4/2005 |
| KR | 1020050087651 A | 8/2005 |
| WO | WO 91/18390 | 11/1991 |

* cited by examiner

*Primary Examiner*—Jefferson Evans
(74) *Attorney, Agent, or Firm*—Volentine & Whitt, PLLC (57) ABSTRACT

A hard disk drive includes a base including a plurality of internal parts related to reading and writing of information. The hard disk drive also includes a cover which shields an upper surface of the base. The hard disk drive also includes a ground rib which provides at least a partial contact area between the upper surface of the base and a lower surface of the cover and which connects the base and cover at a predetermined position. The hard disk drive also includes a plurality of screws which couple the cover to the base by passing through the ground rib.

16 Claims, 8 Drawing Sheets

HARD DISC DRIVE INCLUDING GROUND RIB TO CONNECT COVER AND BASE

BACKGROUND OF THE INVENTION

1. Field of the Invention

The present invention relates generally to a hard disk drive and, more particularly, to a hard disk drive including a mechanism that reduces electric magnetic interference (EMI) in the hard disk drive.

This application claims priority under 35 U.S.C. §119 from Korean Patent Application No. 10-2005-0125038, filed on Dec. 19, 2005, in the Korean Intellectual Property Office, the entirety of which is hereby incorporated by reference.

2. Description of Related Art

Hard disk drives (HDDs) are memory devices that are used to record and reproduce data by converting digital electric pulses to a magnetic field. This conversion of data from a digital form to a magnetic field makes the data more permanent. HDDs include various electronic and mechanical components to perform the functions of recording and reproducing data. While HDDs have many applications, HDDs are, widely used as auxiliary memory devices of computer systems because of their ability to provide quick access to large amounts of data.

With the recent increase in TPI (tracks per inch) and BPI (bits per inch), the capacity of HDDs has increased. This increase in capacity has increased the fields in which HDDs may be used. For example, a compact HDD having a diameter of 0.85 inches, i.e., a size similar to that of a coin, has been developed recently and is expected to be used in mobile phones in the future. While a HDD has various uses, the HDD is more susceptible to vibrations and shocks compared to other memory devices. Various efforts have been directed towards studying and remedying this problem.

Figure 1:
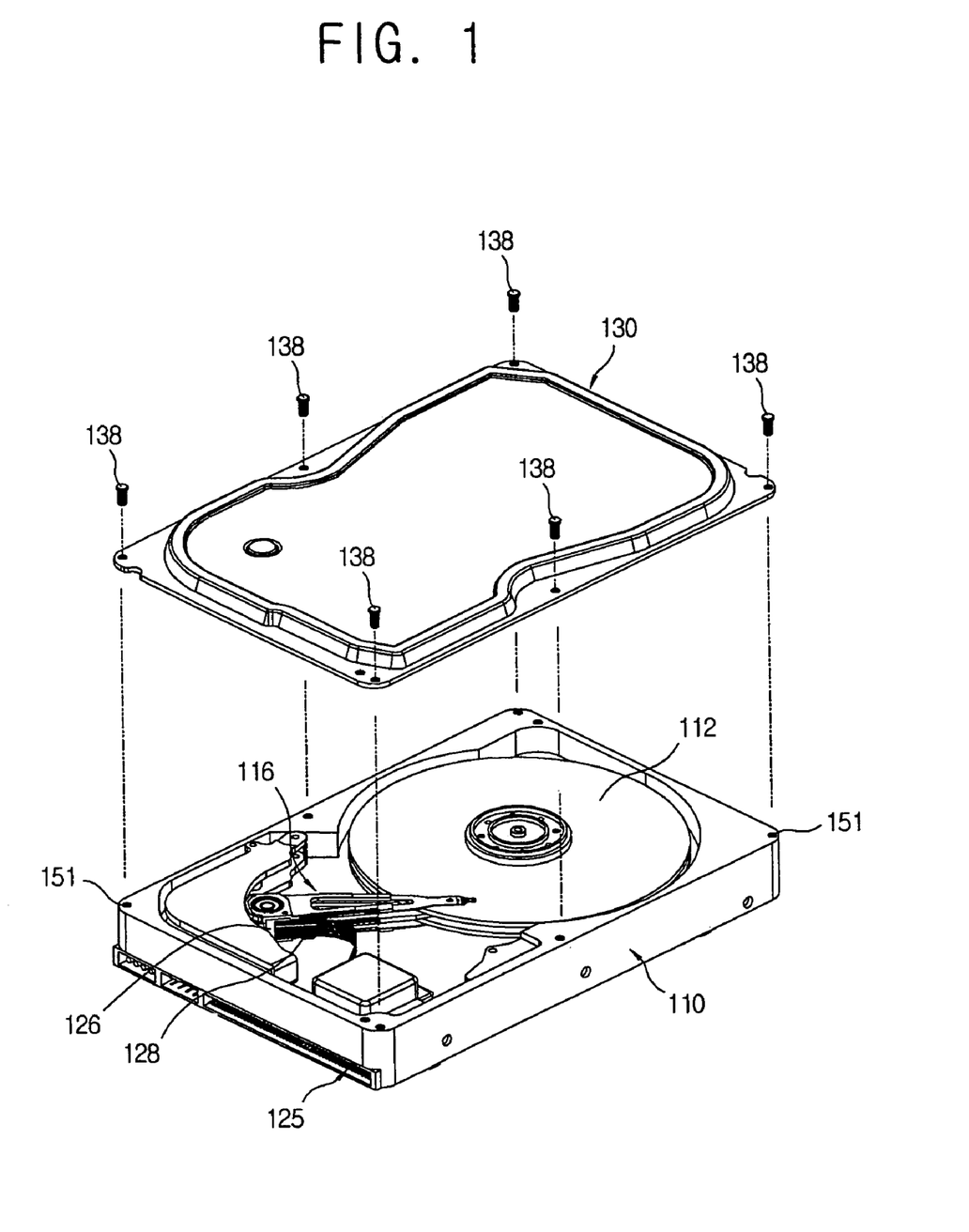
FIG. 1 is an exploded perspective view of a conventional HDD.

FIG. 1 is an exploded perspective view of a conventional HDD. Referring to FIG. 1, a conventional HDD includes a base 110 and a cover 130. The cover 130 is used to shield an upper opening portion of the base 110. A plurality of internal parts related to reading and writing of information are installed on the base 110, which will be described later. For example, a disk 112 for recording and storing data and a head stack assembly (HSA) 116 for reading or writing information on the disk 112 while moving across the disk 112 are installed on the base 110.

The base 110 includes many internal parts. Furthermore these internal parts operate based on predetermined signals. Therefore, these internal parts produce electromagnetic waves. These electromagnetic waves may be transmitted as electromagnetic energy to other devices that are located near the internal parts. In particular, the electromagnetic energy may be transferred to the other devices by means such as, for example, conduction and radiation. Furthermore, this electromagnetic energy, which is also known as electromagnetic interference (EMI) may damage the other devices and thus affect the performance of the apparatus that includes the HDD and these other devices. The apparatus may include electronic equipment such as, for example, a computer and a notebook.

As shown in FIG. 1, a cover 130 is coupled to the upper surface of the base 110 to protect the internal parts. Specifically, the cover 130 is coupled to the base 110 using six screws 138. Because of the coupling of the cover 130 to the base 110, an electromagnetic wave generated by the internal parts is shielded. Generally, as shown in FIG. 1, the cover 130 is coupled to the base 110 using a total of the six screws 138. Specifically, three screws each are used along each, of the longer side of the cover 130.

However, when the cover 130 is coupled to the base 110 using the six screws 138 as shown in FIG. 1, the effect of preventing the EMI is low. In particular, an electromagnetic wave is generally emitted from a preamplifier 126 installed on the HSA 116 or a flexible printed circuit (FPC) 128 connecting the preamplifier 126 to a printed circuit board assembly (PCBA) 125. The effect of shielding the electromagnetic wave generated in the vicinity of the HSA 116 using the six screws 138 is relatively low.

Figure 2:
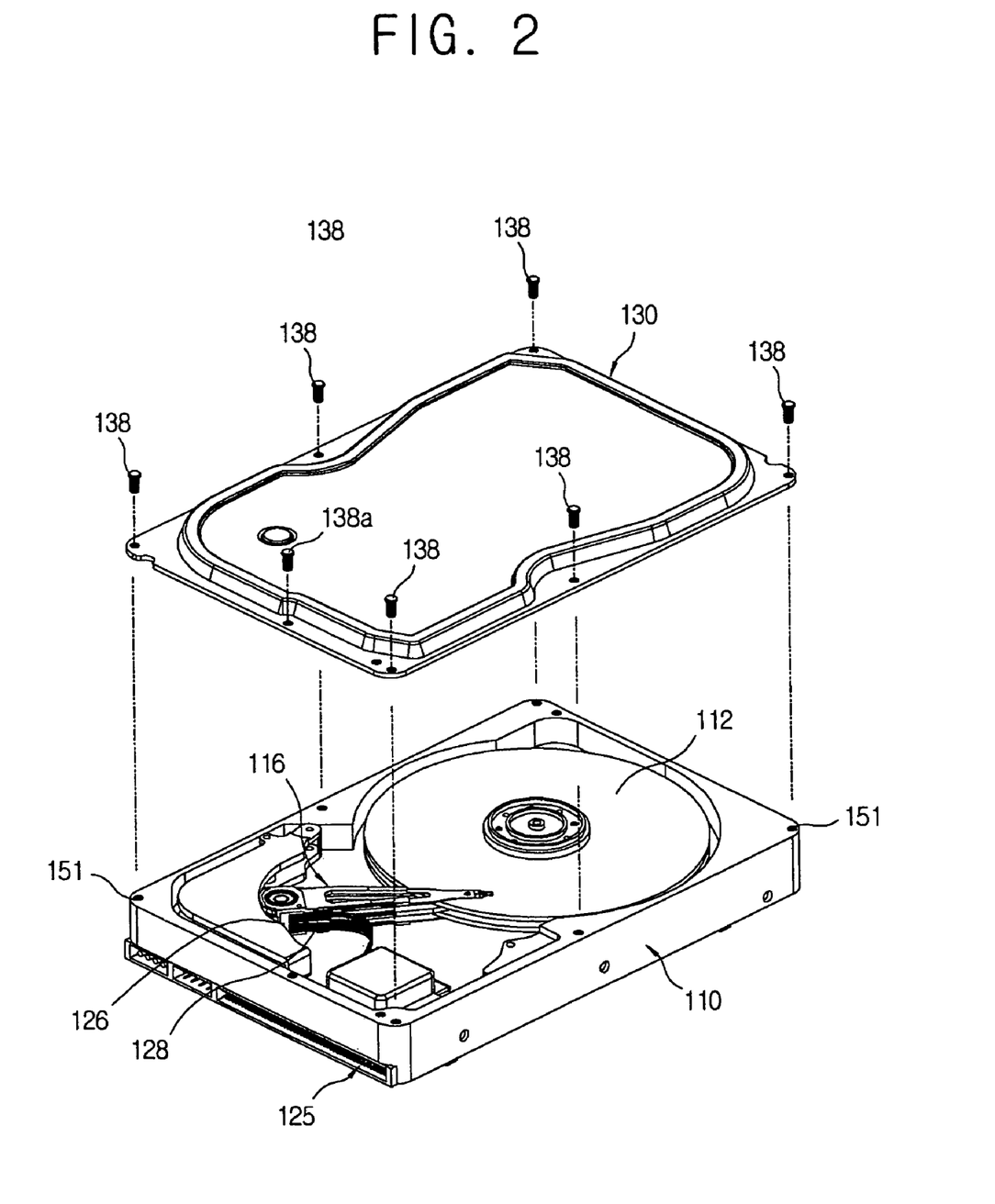
FIG. 2 is an exploded perspective view of another conventional HDD.

To solve the above-mentioned problem, according to another conventional HDD, as shown in FIG. 2, an additional screw 138a is further provided in the center area of a short side of the cover 130. This is the area where the HSA 116, which is the most sensitive portion of the HDD, is located. Thus, a total of seven screws—138 and 138a, are used to fix the cover 130 to the base 110.

However, the conventional HDD has a number of shortcomings. For example, as shown in FIG. 2, when the number of the screws 138 and 138a for a single HDD increase, the cost of assembling the HDD rises. Furthermore, the time taken to couple the cover 130 to the base 110 increases. Furthermore, because a gasket (not shown) is also installed between the base 110 and the cover 130 as a means to closely combine the cover 130 and the base 110, when the screw 138a is also used as shown in FIG. 2, the shape and structure of the gasket needs to be changed. This modification of the gasket may increase the complication of the HDD assembly process because of an increase in the time and effort required to install the gasket.

BRIEF SUMMARY

One aspect of the present disclosure includes a hard disk drive. The hard disk drive includes a base including a plurality of internal parts related to reading and writing of information. The hard disk drive also includes a cover which shields an upper surface of the base. The hard disk drive also includes a ground rib which provides at least a partial contact area between the upper surface of the base and a lower surface of the cover and which connects the base and cover at a predetermined position. The hard disk drive also includes a plurality of screws which couple the cover to the base by passing through the ground rib.

BRIEF DESCRIPTION OF THE DRAWINGS

The above and/or other aspects of the present invention will become apparent and more readily appreciated from the following detailed description, taken in conjunction with the accompanying drawings of which.

DETAILED DESCRIPTION OF EXEMPLARY EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the accompanying figures.

Figure 3:
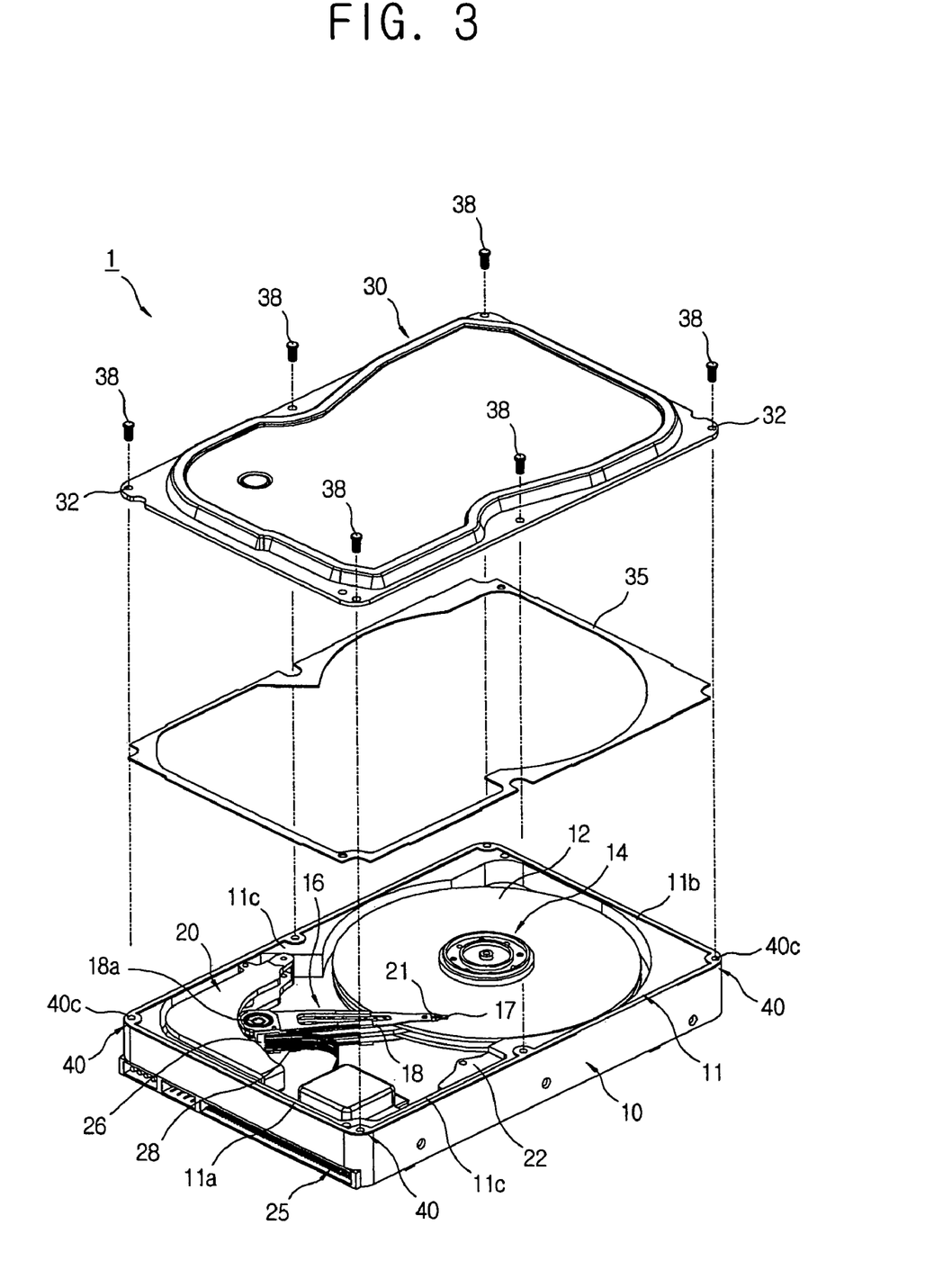
FIG. 3 is an explosive perspective view of an HDD according to an exemplary disclosed embodiment of the present invention.
Figure 4:
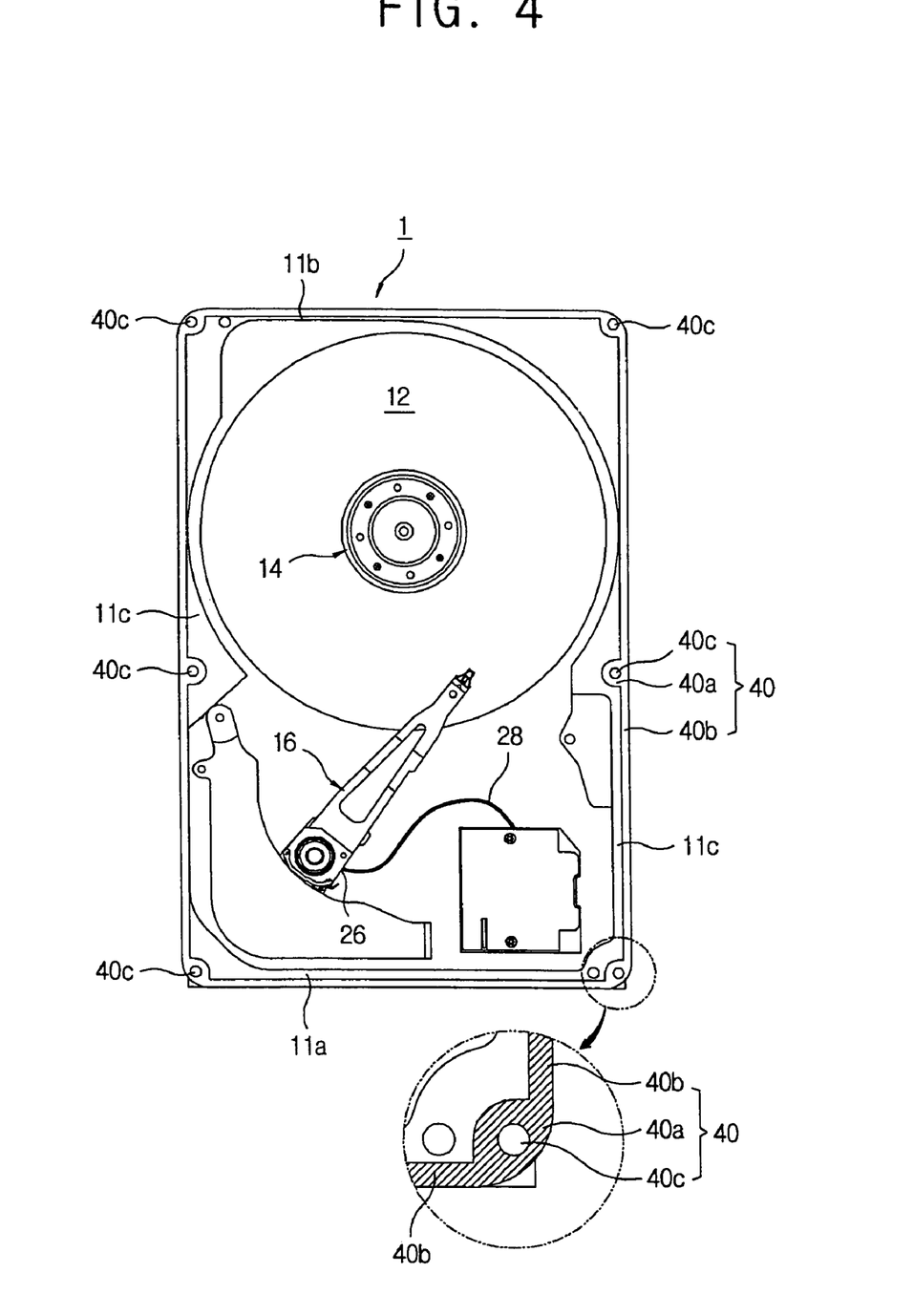
FIG. 4 is a plan view of the base of FIG. 3.

FIG. 3 is an explosive perspective view of an HDD 1 according to an exemplary embodiment of the present invention. FIG. 4 is a plan view of the base of FIG. 3. Referring to FIGS. 3 and 4, the HDD 1 includes a base 10, a cover 30 shielding an upper opening portion of the base 10, and a gasket 35 interposed between the base 10 and the cover 30. As will be described later, a plurality of internal parts (not shown) related to reading and writing of information are installed on the base 10. A concave inner space is formed on an upper surface of the base 10 shown in FIG. 3 where the internal parts are accommodated and installed. This type of a base is referred to as a bowl type base.

The bowl type base 10 is formed of aluminum having a predetermined thickness. This structure may maintain stiffness and perform a ground function with respect to the internal parts included in the base 10. Various types of processes may be used to form base 10. For example, the base 10 may be formed of aluminum through injection mold or press processing. A variety of internal parts related to the reading and writing of information are installed on the base 10 as described above. The internal parts related to the reading and writing of information include at least one disk 12 to record and store data, a spindle motor 14 provided at the center area of the disk 12 and rotating the disk 12, a head stack assembly (HSA) 16 that moves relatively towards the disk 12, and a ramp 22 provided at the side of the disk 12.

The HSA 16 includes a magnetic head 17 that writes or reads data with respect to the disk 12. The HSA 16 also includes an actuator 18 that makes the magnetic head 17 fly so that the magnetic head 17 can access the data on the disk 12. Specifically, the actuator 18 is installed such that the actuator 18 is capable of rotating around a pivot shaft 18a with respect to the disk 12. That is, as a bobbin installed at the side end of the actuator 18 moves left and right by the operation of a voice coil motor (VCM) 20, the magnetic head 17 installed at the other end thereof moves across the disk 12 to read or write data on a track of the disk 12. The magnetic head 17 installed at an end of a head gimbal 21 extending from the actuator 18 and connected thereto rises by the air flow on the surface of the disk 12 as the disk 12 rotates at high speed. Thus, the magnetic head 17 flies while maintaining a fine gap with the surface of the disk 12.

The magnetic head 17 is parked on the ramp 22 when the supply of power to the HDD 1 is discontinued. This method of parking the magnetic head 17 on the ramp 22 during a "power OFF" status is referred to as a ramp loading method. However, in some HDDs, a parking zone where data is not written is provided at the inner circumferential side of the disk 12 and the magnetic head 17 is parked in the parking zone. This method is referred to as a contact start stop (CSS) method. One skilled in the art will appreciate that the present invention can also be applied to the HDD employing the CSS method. Furthermore, the ramp 22 is excluded from the HDD employing the CSS method.

A preamplifier 26 to amplify a signal is provided at the side surface of the HSA 16. The preamplifier 26 is connected to a printed circuit board assembly (PCBA) 25 provided at the lower portion of the base 10 by a flexible printed circuit (FPC) 28. The PCBA 25 controls the above-described internal parts when most circuit internal parts are installed on the PCB. The preamplifier 26, the FPC 28, and the PCBA 25 are the above-described internal parts.

The cover 30 is coupled to the upper surface of the base 10 with the gasket 35 to form a seal. The cover 30 not only protects the internal parts, but also prevents transfer of electromagnetic waves (electromagnetic energy) generated by the internal parts to other parts by way of radiation or conduction that may affect the performance of the other parts. To this end, in the prior art, the six screws 138 of FIG. 1 or the seven screws 138 and 138a of FIG. 2, are used so that the cover 30 is coupled to the base 10.

However, as described above, when only the six screws 138 only are used, an effect of preventing the EMI is not impressive. Furthermore, when the seven screws 138 and 138a are used, the effect of preventing the EMI can be improved to some degree. Nevertheless, as described above, one or more other problems due to the use of the additional screw 138a may occur. Accordingly, in the present disclosure, the above-mentioned problems are solved by improving the structure of an HDD as follows so as to reduce the EMI caused by electromagnetic waves generated by internal parts of the HDD.

Referring back to FIGS. 3 and 4, in the present embodiment, a total of six screws 38 are used to couple the cover 30 and the base 10. That is, three screws each are coupled, at identical intervals, at each long side 11c of FIG. 4 between the cover 30 and the base 10. To this end, a through hole 32 through which the screws 38 pass is formed in the cover 30. In the prior art, the screw holes 151 of FIGS. 1 and 2 are formed in the same line as that of the through holes 32 of the cover 30 of FIGS. 3 and 4. Furthermore, in the prior art, the screw holes are formed at an upper edge portion 11 of the base 10 to which the screws 38 are coupled. In the present embodiment, a ground rib 40 is provided at this area. In all the following embodiments, the reference numeral of the ground rib is 40.

When the cover 30 is coupled to the base 10 using the screw 38, the ground rib 40 equally distributes a clamping force exerted by the screw 38 into a wider area. This clamping force lets the cover 30 and the base 10 come in close contact with each other and thus firmly couples the cover 30 to the base 10. To this end, the ground rib 40 provides at least a partial contact area between the upper edge portion 11 of the base 10 and the lower surface of the cover 30 to connect both the base 10 and the cover 30 and form a seal therebetween. Furthermore, the ground rib 40 has a predetermined thickness according to the direction of the height of the base 10 and a predetermined width parallel to the upper edge portion 11 of the base 10.

The ground rib 40 can be separately manufactured and inserted between the cover 30 and the base 10 when the HDD 1 is assembled, or coupled to the lower surface of the cover 30, or integrally attached to the lower surface of the cover 30. Alternatively, the ground rib 40 can be coupled to the upper edge portion 11 of the base 10 or integrally formed with the upper edge portion 11 of the base 10. Although, as described above, the ground rib 40 can be formed in any form and provided at any position, in the present embodiment, the ground rib 40 is integrally formed with the upper edge portion 11 of the base 10.

When the ground rib 40 is formed at the upper edge portion 11 of the base 10, the ground rib 40 can be provided to, have substantially the same area as the upper edge portion 11 of the base 10. However, in this case, the cost for providing the ground rib 40 may increase. Thus, in an exemplary embodiment, the ground rib 40 is continuously formed along the upper edge portion 11 of the base 10 while having an area relatively less than the entire area of the upper edge portion 11 of the base 10. In this case, the gasket 35 can be placed in an area of the upper edge portion 11 of the base 10 where the ground rib 40 is not formed. Furthermore, the gasket 35 can be installed to cover the upper surface of the ground rib 40.

The ground rib 40 includes a number of components that couple the cover 30 the base 10 of the HDD 1. Specifically, the ground rib 40 includes a corner area of each of first and second short sides 11a and 11b in the upper edge portion 11 of the base 10. Furthermore, the ground rib 40 includes a rib body 40a formed in almost the central area of the long side 11c, and a rib wing 40b integrally connecting the rib body 40a and the neighboring rib body 40a. In addition, the ground rib 40 is formed to be relatively smaller than the width of the rib body 40a. Furthermore, a screw hole 40c is formed in the rib body 40a in the same line with that of through hole 32 of the cover 30.

In the operation of the HDD 1 configured as above, the internal parts are installed on the base 10. Furthermore, the cover 30 is arranged on the upper surface of the base 10. In addition, the cover 30 and the base 10 are coupled to each other using the six screws 38. Specifically, the screw 38 is coupled to the base 10 via the through hole 32 of the cover 30 and the screw hole 40c of the ground rib 40. This coupling of the screw 38 to the base 10 generates a clamping force. The clamping force generated by the six screws 38 is equally distributed into a wider area by the ground rib 40. Thus, the cover 30 can come in close contact the base 10 and be firmly coupled to the base 10, forming a seal. This seal can block EMI generated by the internal parts of HDD 1.

In the above-described embodiment, the ground rib 40 is continuously formed along the upper edge portion 11 of the base 10. However, as described below, even when the ground rib 40 is at least partially divided and provided at a desired position along the upper edge portion 11 of the base 10, the effect of the present invention can be achieved without difficulty. This will now be described with reference to FIGS. 5 through 7.

Figure 5:
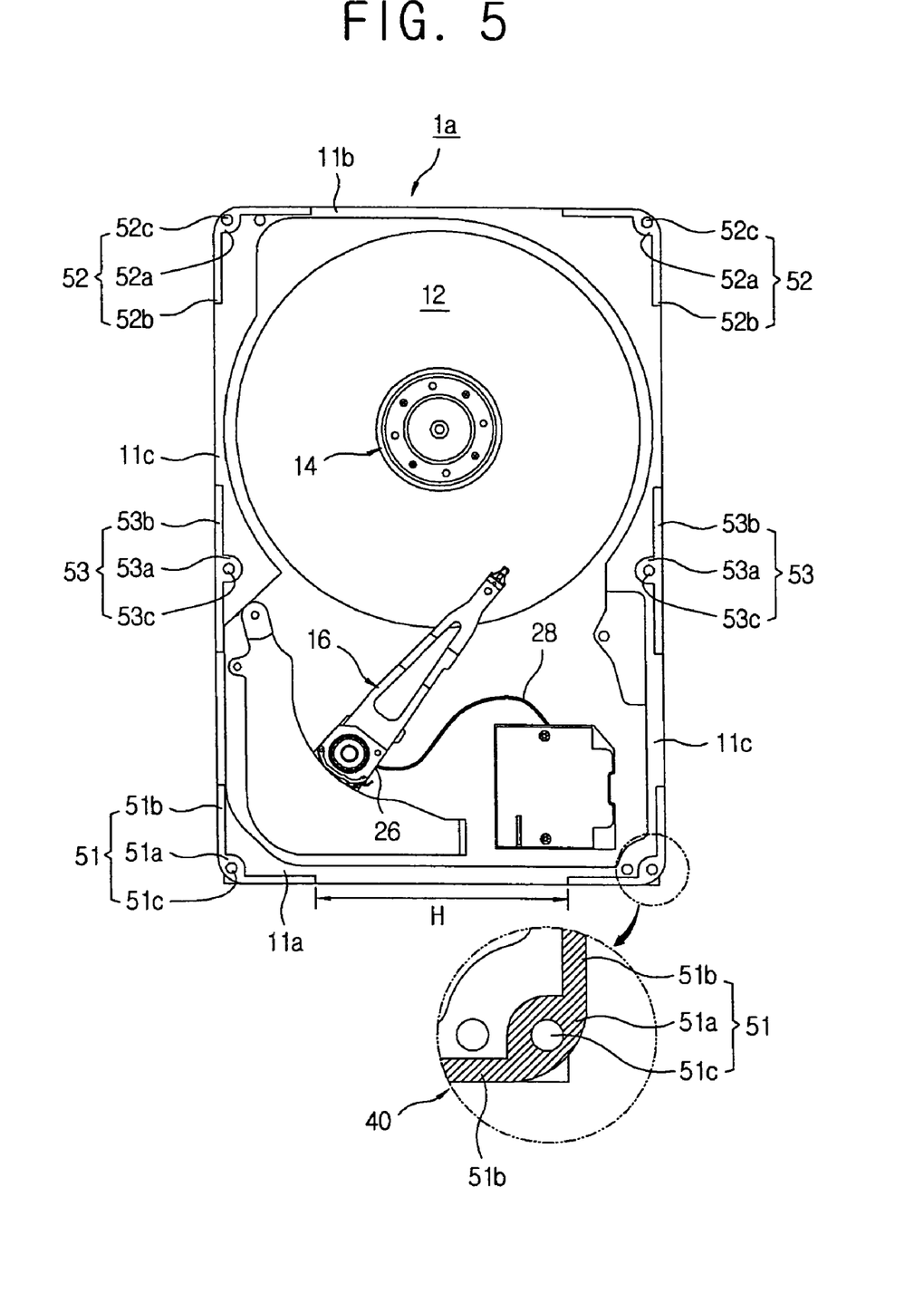
FIG. 5 is a plan view of a base of an HDD according to an alternative exemplary disclosed embodiment of the present invention.

FIG. 5 is a plan view of a base of an HDD according to another exemplary embodiment of the present invention. Referring to FIG. 5, in an HDD 1a, the ground rib 40 provided on the upper edge portion 11 of the base 10 is divided into a plurality of unit rib portions 51, 52, and 53 at predetermined positions. The unit rib portions 51, 52, and 53 are first through third unit rib portions 51, 52, and 53, respectively.

The first unit rib portion 51 is provided at both corner areas of a first short side 11a of the base. Specifically, the first unit rib portion 51 is provided where the HSA 16 among the internal parts is located, i.e., on the upper edge portion 11 of the base 10. Alternatively, the first unit rib portion 51 can be provided at the central area of the first short side 11a instead of both corner areas of the first short side 11a of the base 10. However, in the present exemplary embodiment, the first unit rib portion 51 is provided as a pair in both corner areas of the first short side 11a.

Each first unit rib portion 51 includes a first rib body 51a provided at the corner area of the first short side 11a of the base 10 and having a first screw hole 51c to which the screw 38 is coupled at a predetermined position and a first rib wing 51b extending from the side portion of the first rib body 51a toward the first short side 11a and the long side 11c of the base 10. A distance H between the first short side 11a and the first rib wing 51b of the base 10 is relatively shorter than a distance connecting the first screw holes 51c.

While designing the HDD 1a, it may be beneficial to design the distance H between the first short side 11a of the base 10 and the first rib wing 51b such that it does not exceed at least 7.5 cm. In particular, the above-mentioned design may be beneficial because the first short side 11a of the base 10 is relatively closer to the preamplifier 26 or the FPC 28 which generates a relatively large amount of an electromagnetic wave. For reference, in the HDD 1a, as the internal transfer rate increases, an internal frequency (high frequency) increases. The frequency can characteristically pass a very fine aperture (the distance H).

$$\lambda = C/f \qquad \text{[Equation 1]}$$

Here, $\lambda$ is a wavelength, C is a velocity of light, f is a frequency, and C is $3 \times 10^8$ m/sec.

Referring to Equation 1, because a wavelength is typically inversely proportional to a frequency, when the frequency increases, the wavelength decreases. This decrease in wavelength may permit the energy wave to pass a small aperture. For example, the wavelength of a wave having a frequency of 1 GHz is 30 cm. Therefore, an EMI reduction may be generally obtained only when the distance H is designed to be less than $\lambda/4$. That is, it may be desirable to design the distance H to be not more than 7.5 cm. Consequently, as the frequency of an energy wave increases, a small distance H may be desirable to prevent radiation of the energy wave to the external environment. For a higher frequency, it is difficult to improve the EMI even when the number of the screws 138a of FIG. 2 is increased as shown in FIG. 2.

The second unit rib portion 52 is provided in each of both corner areas of the second short side 11b on the upper edge portion 11 of the base 10. The shape of the second unit rib portion 52 does not need to be identical to that of the first unit rib portion 51. However, in an exemplary embodiment, the second unit rib portion 52 is symmetrical to the first unit rib portion 51. The second unit rib portion 52 includes a second rib body 52a provided in each of both corner areas of the second short side 11b of the base 10 having a second screw hole 52c to which the screw 38 is coupled and a second rib wing 52b extending from the side portion of the second rib body 52a toward the second short side 11b and the long side 11c of the base 10.

The third unit rib portion 53 is arranged between the first and second unit rib portions 51 and 52. The third unit rib portion 53 is provided as a pair like the first and second unit rib portions 51 and 52 and located at each of both long sides 11c of the base 10. The third unit rib portion 53 includes a third rib body 53a having a third screw hole 53c to which the screw 38 is coupled and a third rib wing 53b extending from the side portion of the third rib body 53a toward the first and second short sides 11a and 11b of the base 10.

In the embodiment shown in FIG. 5, the thicknesses of the first through third unit rib portions 51, 52, and 53 is substantially the same. Accordingly, the cover 30 and the base 10 can come in close contact with each other. However, the lengths of the rib wings 51b, 52b, and 53b formed on the first through third unit rib portions 51, 52, and 53 respectively, may be identical or partially different. Furthermore, although the rib wings 51b, 52b, and 53b are all formed in pairs on the rib bodies 51a, 52a, and 53a corresponding thereto, they can be formed to have only one wing.

When the ground rib 40 is configured as shown in FIG. 5 and the base 10 is coupled to the cover 30, the clamping force by the six screws 38 is equally distributed into a wider area by means of the first through third unit rib portions 51, 52, and 53. Thus, the cover 30 is more firmly coupled to the base 10 to form a tighter seal. Thus, the electromagnetic wave that may leak out of the HDD 1a through a gap between the cover 30 and the base 10 can be blocked in advance so that the EMI caused by the electromagnetic wave can be reduced. One skilled in the art will appreciate that all of the first through third unit rib portions 51, 52, and 53 do not need to have the same shape as that of FIG. 5. That is, the first through third unit rib portions 51, 52, and 53 may be selectively employed or excluded at appropriate positions based on the frequency used for the HSA 16.

Figure 6:
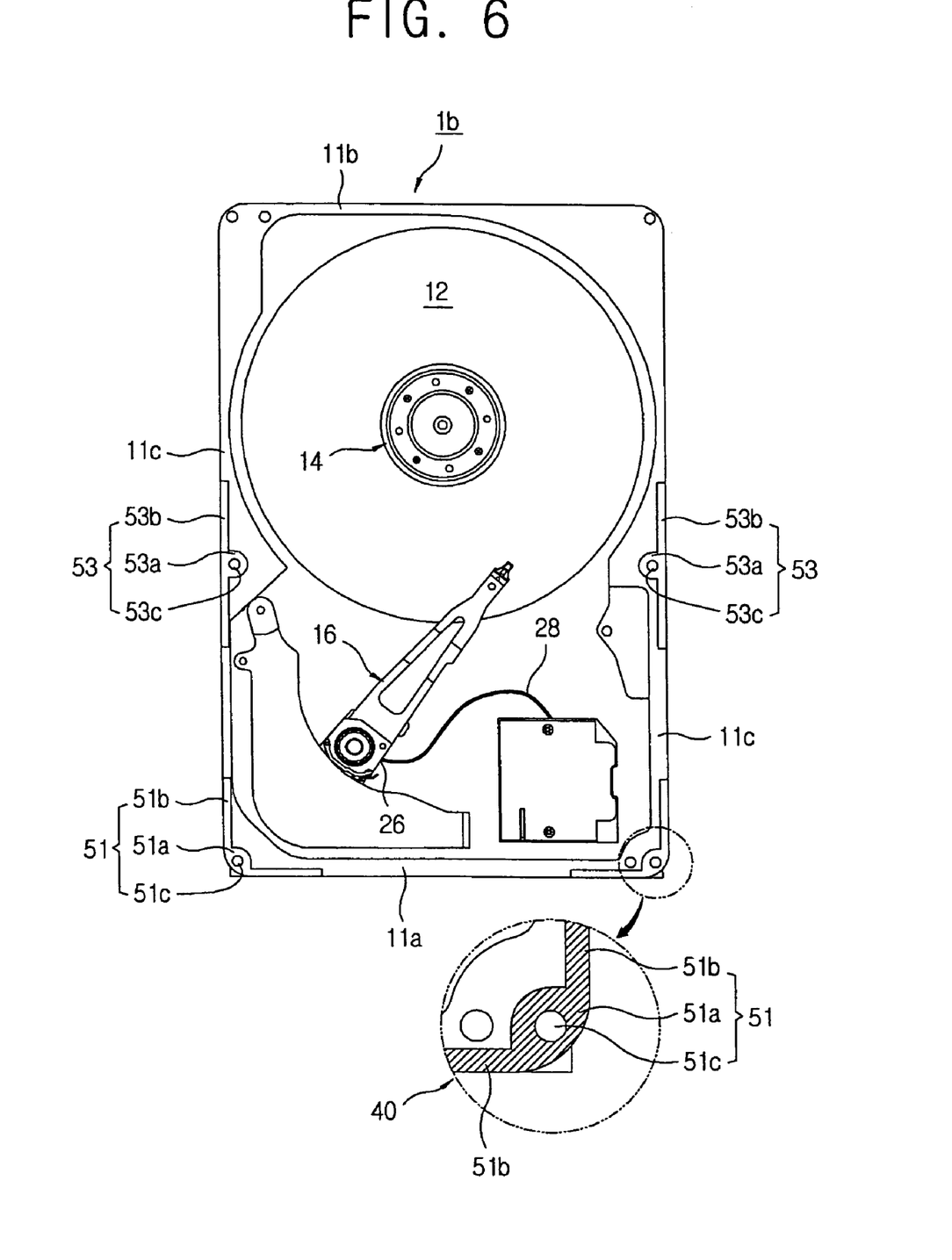
FIG. 6 is a plan view of a base of an HDD according to yet another exemplary disclosed embodiment of the present invention.
Figure 7:
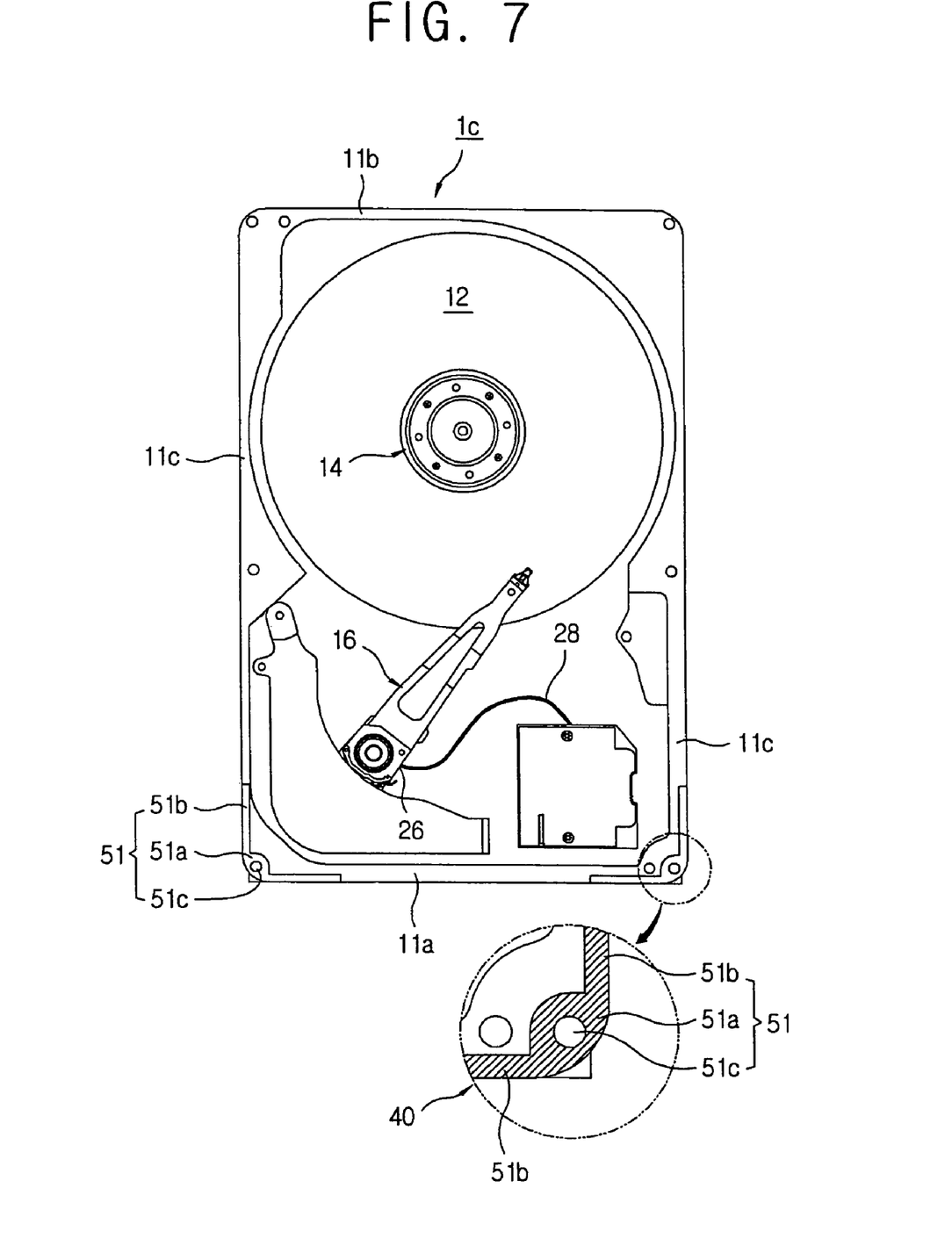
FIG. 7 is a plan view of a base of an HDD according to yet another exemplary disclosed embodiment of the present invention.

FIGS. 6 and 7 are plan views of the base 10 of HDDs 1b and 1c respectively, according to two other exemplary embodiments of the present invention. Referring to the HDD 1b of FIG. 6, the first and third unit rib portions 51 and 53 only are provided at predetermined positions while the second unit rib portion 52 of FIG. 5 is excluded. Referring to an HDD 1c of FIG. 7, the first unit rib portion 51 only is provided at a predetermined position while the second and third unit rib portions 52 and 53 of FIG. 5 are excluded. When the HDD is configured as shown in FIGS. 6 and 7, the same sealing effect as that produced by the embodiments disclosed in FIGS. 4 and 5 may be obtained. However, as described above, because the first short side 11a of the base 10 is located close to the preamplifier 26 or FPC 28 which generates a relatively large amount of electromagnetic energy, it is substantially difficult to exclude the first unit rib portion 51.

Figure 8:
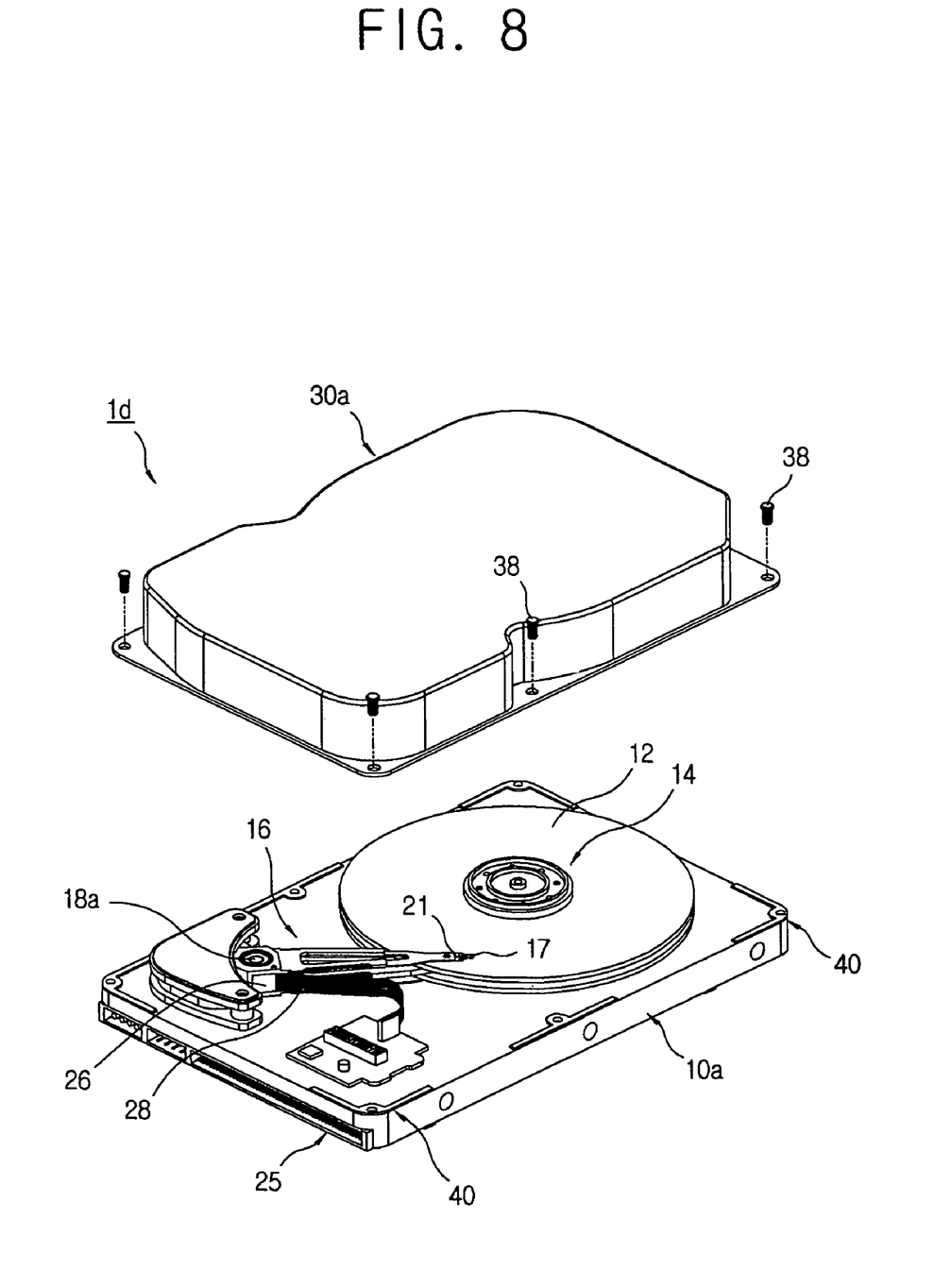
FIG. 8 is an exploded perspective view of a base of an HDD according to yet another exemplary disclosed embodiment of the present invention.

FIG. 8 is an exploded perspective view of an HDD according to yet another exemplary embodiment of the present invention. In the above-described four embodiments, the technical concept of the present invention is applied to the base 10 that is a bowl type. However, an HDD 1d of FIG. 8 has a base 10a that is a flat type, in which the internal parts are installed on a flat upper surface thereof, and the technical concept of the present invention can be sufficiently applied to the base 10a. For reference, for the flat type base 10a of FIG. 8, a cover 30a is manufactured differently than the cover 30 of the above-described four embodiments.

Referring to FIG. 8, the ground rib 40 can be continuously formed along the edge of the upper surface of the base 10a or selectively provided at predetermined positions by being divided into a plurality of unit rib portions (not shown). Although in the above-described embodiments, the unit rib portions are divided into first through third unit rib portions 51, 52, and 53; additional unit rib portions may be used if necessary.

The disclosed HDD may be used in any application including hard drives. As described above, a cover is more firmly and closely coupled to a base of a HDD by using ground ribs. The use of ground ribs as a coupling and sealing mechanism may solve the problems associated with using an additional screw to couple a cover to the base of the HDD. For example, the use of ground ribs may help reduce EMI that is generated by internal parts that are installed on the base.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A hard disk drive comprising:
a base including a plurality of internal parts related to reading and writing of information, the internal parts including a head stack assembly;
a cover which shields an upper surface of the base;
a ground rib which provides at least a partial contact area between the upper surface of the base and a lower surface of the cover and grounding the base and cover at a predetermined position to allow the base and cover to closely contact each other; and
a plurality of screws coupling the cover to the base by passing through the ground rib,
wherein the ground rib is divided into a plurality of separate first, second and third unit rib portions which are spaced apart from each other and arranged along the upper edge portion of the base,
wherein the first unit rib portions are located at respective corner areas of a first short side the base where the head stack assembly is located;
wherein the second unit rib portions are located at respective corner areas of a second short side of the base which is opposite the first short side of the base;
wherein the third unit ribs are located between the first and second unit rib portions on respective long sides of the base; and
wherein each of the plurality of first unit rib portions comprises:
a first rib body including a first screw hole to which at least one of the plurality of screws is coupled, and provided at the respective corner area of the first short side of the base; and
a first rib wing extending from a side portion of the first rib body toward at least one of the first short side and one of the respective long sides of the base.

2. The hard disk drive of claim 1, wherein a distance between the first short side of the base and the first rib wing is relatively smaller than a distance between the first screw holes formed in the respective first rib bodies.

3. The hard disk drive of claim 1, wherein the second unit rib portions have substantially the same size as the first unit rib portions and are provided as a pair in both corner areas of the second short side of the base.

4. The hard disk drive of claim 3, wherein each of the second unit rib portions comprises:
a second rib body including a second screw hole to which at least one of the plurality of screws is coupled, and provided at a corner area of the second short side of the base; and
a second rib wing extending from a side portion of the second rib body toward at least one of the second short side and a long side.

5. The hard disk drive of claim 4, wherein the third unit rib portions are provided as a pair at both long sides of the base.

6. The hard disk drive of claim 5, wherein the each of the third unit rib portions comprises:
a third rib body including a third screw hole to which at least one of the plurality of screws is coupled; and
a third rib wing extending from a side portion of the third rib body toward at least one of the first and second short sides.

7. The hard disk drive of claim 6, wherein the first through third unit rib portions are integrally formed with the base.

8. The hard disk drive of claim 7, wherein the thicknesses of the first through third unit rib portions are substantially the same.

9. The hard disk drive of claim 8, wherein the lengths of the first rib wing, the second rib wing and the third rib wing formed in the first through third unit rib portions are the same.

10. The hard disk drive of claim 8, wherein the lengths of the first rib wing, the second rib wing, and the third rib wing formed in the first through third unit rib portions are partially different from one another.

11. The hard disk drive of claim 1, wherein six screws are used.

12. The hard disk drive of claim 1, further comprising a gasket provided on an upper edge portion of the base excluding the ground rib, wherein the gasket is configured to allow the base and cover, to come in contact with each other to form a seal.

13. The hard disk drive of claim 1, wherein the base is one of a bowl type in which an inner space of the upper surface of the base is concave to accommodate the internal parts and a flat type in which the upper surface is flat so that the internal parts are exposed to the upper surface of the base.

14. A hard disk drive comprising:
a base including a plurality of internal parts related to reading and writing of information;
a cover which shields an upper surface of the base;
a ground rib which provides at least a partial contact area between the upper surface of the base and a lower surface of the cover and which connects the base and cover at a predetermined position; and
a plurality of screws which couple the cover to the base by passing through the ground rib;
wherein the ground rib is provided on at least one of an upper edge portion of the base and a lower edge portion of the cover;
wherein the ground rib includes a plurality of unit rib portions divided into parts and arranged along the upper edge portion of the base;
wherein the unit rib portions comprise:
a plurality of first unit rib portions provided in both corner areas of a first short side at a first side of the base where a head stack assembly among the internal parts is located;
a plurality of second unit rib portions provided in both corner areas of a second short side at a second side of the base, wherein the second side of the base is opposite to the first side of the base; and
a plurality of third unit rib portions provided between the first and second unit rib portions;
wherein the first through third unit rib portions are selectively employed at a predetermined portion based on a frequency used for the head stack assembly;
wherein each of the plurality of first unit rib portions comprises:
a first rib body including a first screw hole to which at least one of the plurality of screws is coupled, and provided at a corner area of the first short side of the base; and
a first rib wing extending from a side portion of the first rib body toward at least one of the first short side and a long side.

15. The hard disk drive of claim 14, wherein a distance between the first short side of the base and the first rib wing is relatively smaller than a distance between the first screw holes formed in the respective first rib bodies.

16. A hard disk drive comprising:
a base including a plurality of internal parts related to reading and writing of information;
a cover which shields an upper surface of the base;
a ground rib which provides at least a partial contact area between the upper surface of the base and a lower surface of the cover and which connects the base and cover at a predetermined position; and
a plurality of screws which couple the cover to the base by passing through the ground rib;
wherein the ground rib is provided on at least one of an upper edge portion of the base and a lower edge portion of the cover;
wherein the ground rib includes a plurality of unit rib portions divided into parts and arranged along the upper edge portion of the base;
wherein the unit rib portions comprise:
a plurality of first unit rib portions provided in both corner areas of a first short side at a first side of the base where a head stack assembly among the internal parts is located;
a plurality of second unit rib portions provided in both corner areas of a second short side at a second side of the base, wherein the second side of the base is opposite to the first side of the base; and
a plurality of third unit rib portions provided between the first and second unit rib portions;
wherein the first through third unit rib portions are selectively employed at a predetermined portion based on a frequency used for the head stack assembly;
wherein the third unit rib portions are provided as a pair at both long sides of the base; and
wherein the each of the third unit rib portions comprises:
a third rib body including a third screw hole to which at least one of the plurality of screws is coupled; and
a third rib wing extending from a side portion of the third rib body toward at least one of the first and second short sides.

* * * * *